United States Patent
Chen et al.

(10) Patent No.: US 10,154,201 B2
(45) Date of Patent: Dec. 11, 2018

(54) METHOD FOR ADJUSTING PHOTOGRAPHIC IMAGES TO HIGHER RESOLUTION

(71) Applicant: THREE IN ONE ENT CO., LTD, New Taipei (TW)

(72) Inventors: Tai-Kuo Chen, New Taipei (TW); Hong-Bing Tsai, Yilan (TW)

(73) Assignee: THREE IN ONE ENT CO., LTD, New Taipei (TW)

( * ) Notice: Subject to any disclaimer, the term of this patent is extended or adjusted under 35 U.S.C. 154(b) by 0 days.

(21) Appl. No.: 14/818,849

(22) Filed: Aug. 5, 2015

(65) Prior Publication Data
US 2017/0041575 A1 Feb. 9, 2017

(51) Int. Cl.
*H04N 5/225* (2006.01)
*H04N 5/235* (2006.01)

(52) U.S. Cl.
CPC .................. *H04N 5/2354* (2013.01)

(58) Field of Classification Search
CPC .... H04N 1/00835; H04N 1/6086; H04N 5/58; H04N 5/2256; H04N 5/2354
See application file for complete search history.

(56) References Cited

U.S. PATENT DOCUMENTS

| | | | | |
|---|---|---|---|---|
| 2002/0191102 A1* | 12/2002 | Yuyama | ............... | H04N 5/2256 348/370 |
| 2005/0264685 A1* | 12/2005 | Hoshuyama | ........... | G03B 15/05 348/370 |
| 2006/0103738 A1* | 5/2006 | Sano | .................... | H04N 5/2256 348/222.1 |
| 2012/0224042 A1* | 9/2012 | Saijo | .................... | H04N 5/2256 348/77 |
| 2014/0293091 A1* | 10/2014 | Rhoads | ................... | G01J 3/513 348/234 |
| 2015/0130958 A1* | 5/2015 | Pavani | .................. | H04N 9/646 348/217.1 |

* cited by examiner

*Primary Examiner* — Twyler L Haskins
*Assistant Examiner* — Dwight Alex C Tejano
(74) *Attorney, Agent, or Firm* — WPAT, PC

(57) ABSTRACT

A method for adjusting photographic images is disclosed, comprising, upon photographing an image by means of a photographic lens, detecting the intensity of the ambient light in the environment, sequentially projecting the light source of different color to a photographic object with an active light source, and acquiring different reflection feedback values according to the projected light source of different colors; then, based on the intensity of the ambient light and the intensity range of light source projected on the photographic object from the active light source, performing adjustments on the acquired photographic image. In this way, in an environment where the light source is weak or insufficient, after the adjustments, it is possible to present an image resolution that the image should demonstrate in an environment having normal light sources, and for the nocturnal photography, by processing the image of dimmer peripheries, it is further possible to present a colorful and clear image.

15 Claims, 4 Drawing Sheets

| Environmental Lumen Value | Corresponding Multiples | Non-illuminated Detected Relative Intensity | Illuminated Detected Relative Intensity |
|---|---|---|---|
| 1000 | 1 | 100 | 110 |
| 100 | 10 | 10 | 20 |
| 10 | 100 | 1 | 11 |
| 1 | 1000 | 0.1 | 10.1 |

*FIG.3*

METHOD FOR ADJUSTING PHOTOGRAPHIC IMAGES TO HIGHER RESOLUTION

BACKGROUND OF THE INVENTION

1. Field of the Invention

The present invention generally relates to a method for adjusting photographic images; in particular, it relates to a method for adjusting photographic images, which is capable of processing and presenting a colorful image of high resolutions in an environment having weak or insufficient light sources.

2. Description of Related Art

In photographing, light in a photographic environment may be generally supplied by a variety of mixed light sources (including, for example, natural light, fluorescent tubes, fluorescent lamps, . . . etc.), so the luminance is sufficient and clear images can be captured.

However, in case it is in a pretty dusky environment, this usually requires a flashlight to operate conjunctively for light compensations in order to enhance the integral brightness on the photographic picture to obtain a clear image. But, it should be understood that, in a photographic environment of low brightness (e.g., the nocturnal photography), the ambient light surrounding the background objects typically may be the pale yellowing light having warmer color temperatures, but the white light generated by the flashlight, upon being projected on an object (e.g., a person) located at a closer distance, normally forms a bright area having colder color temperatures, which is seemingly incompatible with the background. In other word, the inconsistence exists between the color temperature of the flash light projected onto the object and the color temperature of other backgrounds, thus causing undesirable dissonance in the overall picture.

Besides, in case that the light source is insufficient thus failing to takes pictures, it is also possible to add an auxiliary infrared light source to perform the nocturnal photography; however, in general, since the images obtained through infrared light are merely images of no colors, the demands on seeking images featuring rich colors and high resolutions are still unable to be satisfied.

Consequently, it should be an optimal solution if it is possible to capture images in an environment having insufficient light sources without using the flashlight or auxiliary infrared light source for illumination assistances, but, during photographing, to sequentially project light source of different color onto a photographic object by means of an active light source, and with the different reflection feedback values acquired by projecting the light source of different color, further based on the intensity of the ambient light, perform adjustments on the acquired photographic images so as to allow the acquired image to demonstrate an image resolution as in an environment having normal light sources.

SUMMARY OF THE INVENTION

The present invention provides a method for adjusting photographic images, which allows to, upon photographing an image, sequentially project light of different colors onto a photographic object by means of an active light source, and with the different reflection feedback values acquired by projecting the light source of different color, further based on the intensity of the ambient light, to perform adjustments on the acquired photographic image such that the acquired image can present an image resolution as in an environment having normal light sources.

The method capable of achieving the aforementioned photographic image adjustments comprises the following steps:

(1) upon photographing an image by means of a photographic lens, detecting the intensity of the ambient light in the environment, and then sequentially projecting light of different colors to a photographic object with an active light source;

(2) with the reflection feedback values acquired by the projected light source of different colors, and based on the intensity of the ambient light, performing adjustments on the acquired photographic image so as to increase the image resolution of the acquired image.

More specifically, in the above-said method for adjusting photographic images, it is possible to project light on the photographic object with three active light sources, and such three active light sources are the green light source, red light source and blue light source.

More specifically, in the above-said method for adjusting photographic images, it is possible to project light on the photographic object with two or more active light sources, and such active light sources can be light sources of any colors.

More specifically, in the above-said method for adjusting photographic images, it is possible to project light on the photographic object with two or more active light sources, and such active light sources can be light sources of different colors generated by means of infrared light having different wavelengths.

More specifically, in the above-said method for adjusting photographic images, the active light sources are light emitting diodes (LEDs).

More specifically, the above-said photographic lens is a CCD, CMOS or high resolution CMOS.

More specifically, in the above-said method for adjusting photographic images, with the acquired reflection feedback values for the projected light source of different colors, and based on the intensity of the ambient light, it is possible to perform the regression analysis so as to adjust the captured photographic image thereby improving the image resolution or enhancing the chrominance of the captured photographic image.

More specifically, in the above-said method for adjusting photographic images, after adjusting the captured photographic image by means of the regression analysis, it is possible to adjust the contrast of the adjusted image so as to highlight one or more colors on the captured photographic image.

More specifically, in the above-said method for adjusting photographic images, upon adjusting the captured photographic image by means of the regression analysis, if the acquired reflection feedback values drop drastically from a high level to a low level, then the line enhancement process can be performed so as to highlight the edge of the object and the profile in the low brightness locations on the acquired photographic image.

More specifically, in the above-said method for adjusting photographic images, it is possible to adjust the light source intensity projected on the photographic object from the active light source.

More specifically, in the above-said method for adjusting photographic images, in an environment of low or insufficient light sources, through the acquired reflection feedback values for the projected light source of different colors, and based on the intensity of the ambient light and the intensity range of light source projected on the photographic object from the active light source, it is possible to perform adjustments on the acquired photographic image such that the acquired image can present the chrominance as in an environment having normal light sources.

More specifically, in the above-said method for adjusting photographic images, in an environment of low or insufficient light sources, through the acquired reflection feedback values for the projected light sources of different colors, and based on the intensity of the ambient light and the intensity range of light source projected on the photographic object from the active light source, it is possible to perform adjustments on the generally photographed but exceedingly dim and chrominance-lacking image thereby presenting a colorful image as in an environment having normal light sources.

More specifically, in the above-said method for adjusting photographic images, the photographic lens can be further connected to a parallel light receiver which allows the photographic lens to receive only the incident parallel light in order to reduce external interferences and improve the resolution of the image photographed by the photographic lens.

More specifically, in the above-said method for adjusting photographic images, the images photographed by projecting the light source of different color can be overlapped, and the overlapped image can be presented in the original colors.

More specifically, in the above-said method for adjusting photographic images, the image photographed by the aforementioned photographic lens is a dynamic image or a static image.

BRIEF DESCRIPTION OF THE DRAWINGS

FIG. 3 shows a data diagram for an embodiment of the method for adjusting photographic images according to the present invention.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
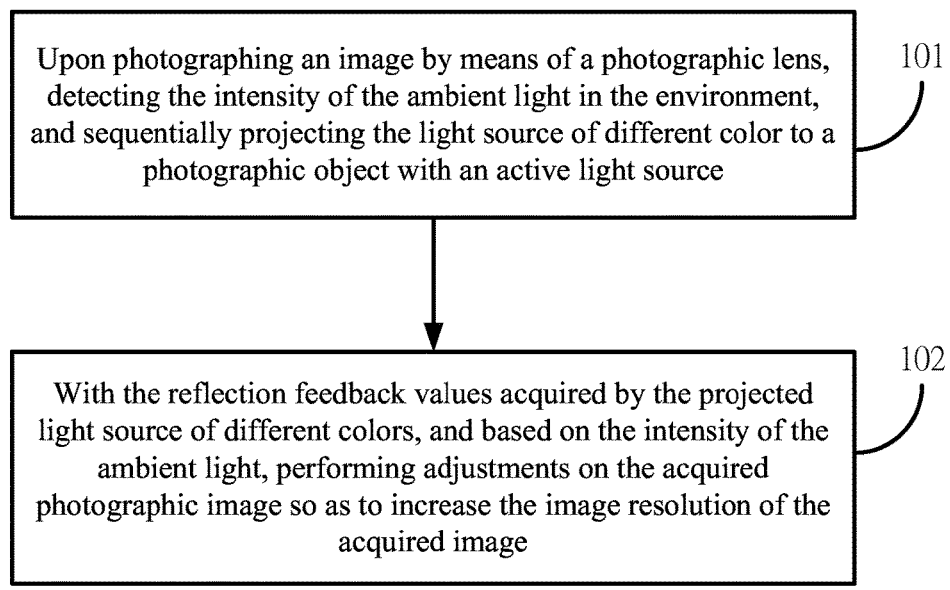
FIG. 1 shows a flowchart of the method for adjusting photographic images according to the present invention.

Refer initially to FIG. 1, wherein a flowchart of the method for adjusting photographic images according to the present invention is shown. It can be appreciated from the Figure that the steps thereof includes:

(1) upon photographing an image by means of a photographic lens, detecting the intensity of the ambient light in the environment, and then sequentially projecting the light source of different color to a photographic object with an active light source (101);

(2) with the reflection feedback values acquired by the projected light source of different colors, and based on the intensity of the ambient light, performing adjustments on the acquired photographic image so as to increase the image resolution of the acquired image (102).

Figure 2:
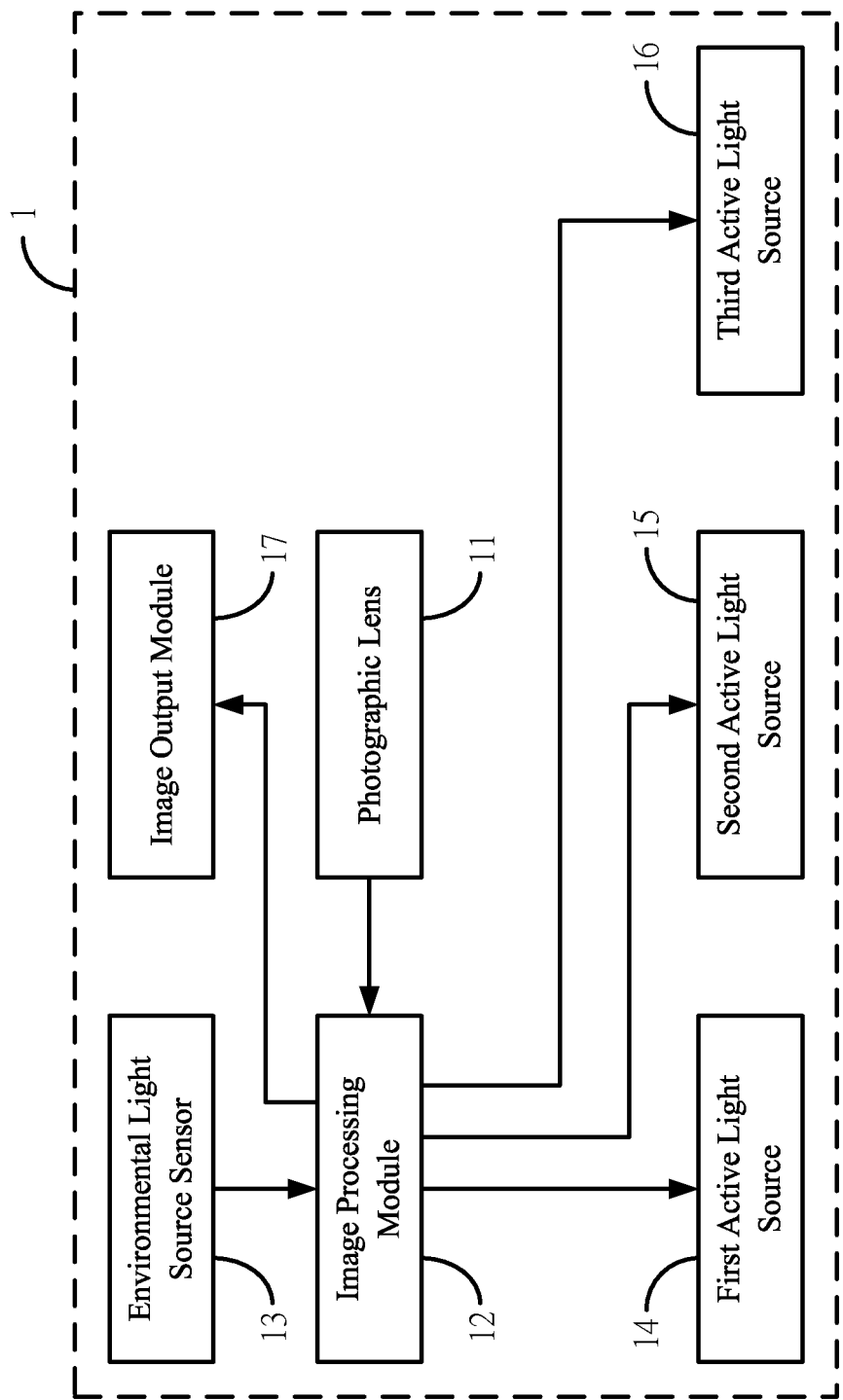
FIG. 2 shows an architectural view for an embodiment of the method for adjusting photographic images according to the present invention.

FIG. 2 shows an architectural view for one embodiment of the method for adjusting photographic images according to the present invention. It can be seen from the Figure that there comprises a photographic device 1 which includes a photographic lens 11, an image processing module 12, an environmental light source sensor 13, a first active light source 14, a second active light source 15, a third active light source 16 and an image output module 17 for outputting the images adjusted and presented in the original colors. Herein, upon photographing by means of the photographic lens 11, the environmental light source sensor 13 can detect the intensity of the ambient light (i.e., the environmental lumen value), and the first active light source 14, second active light source 15 and third active light source 16 sequentially project light of different colors onto a photographic object, the images (including dynamic images or static images) can be captured during the illuminations with different active light sources, and then the image processing module 12 overlaps such photographic images acquired under the light of different colors thereby allowing the overlapped image to be presented in the original colors.

In the present embodiment, the photographic device 1 employs the CCD, CMOS or high resolution CMOS.

Also, in the present embodiment, the first active light source 14 is a red light source, the second active light source 15 is a green light source and the third active light source 16 is a blue light source. However, apart from such an embodiment structure, it is also possible to project the light source on the photographic object with two or more active light sources, and such active light sources can be light sources of any colors. Moreover, the active light sources may be the light sources of different colors generated by the infrared light having different wavelengths, and the aforementioned active light sources are light emitting diodes (LEDs).

Furthermore, the image processing module 12 can also control the intensity of the light source projected onto the photographic object from the first active light source 14, the second active light source 15 and the third active light source 16 since the reflection feedback signals (i.e., the reflection feedback values) may not be easily obtained when the surroundings of the photographic object are exceedingly dark.

Herein the aforementioned overlapping the photographic images acquired by projecting the light source of different color is based on that, when the first active light source 14, second active light source 15 and third active light source 16 sequentially cast light on the photographic object, the photographic lens 11 can obtain their reflection feedback signals (i.e., the reflection feedback values). Afterward, it can perform the regression analysis in accordance with the intensity of the ambient light and the intensity range of light source projected on the photographic object from the active light sources, thus performing adjustments on the acquired photographic image, such that the acquired image can present the chrominance as in an environment having normal light sources. Since the composition of a typical image usually may comprise the resolution, brightness and chrominance (i.e., the purity of color), generally speaking, black, white and gray indicate the color of 0 chrominance (chrominance=0). But the quantization mode with respect to the chrominance may vary in different color models.

Herein the chrominance may further include the properties of the primary color as well as the saturation (i.e., the vividness), and the chrominance is dependent on the intensity of light and the intensity distributions at different wavelengths. The highest chrominance typically can be achieved by strong light of single wavelength (laser, for example), and if the wavelength distribution is kept unchanged, the weaker light intensity means the lower chrominance Therefore, the present invention can further make a color gamut in accordance with different color light sources and the lumens (the intensity of the ambient light) in different environments, and additionally adjusting the intensity range of light source projected on the photographic object from the active light sources, thus completing an advanced color gamut map. As a result, after obtaining the reflection feedback signals (i.e., the reflection feedback values, representing the light sources of different colors) via the photographic lens 11, then according to the intensity of the ambient light and the intensity range of light source projected on the photographic object from the active light sources, and further based on the above-said advanced color gamut map, it is possible to perform the regression analysis thereby restoring the image to the chrominance in an environment having different light intensities.

Next, the reasons why applying active light sources to project light will be explained. For example, taking two pixels on the image of the photographic object, without any active light sources to illuminate, the RGB values at such two pixels (herein the RGB values include the chrominance) are respectively (0.5-0-0) and (0-0-0), while the |R of these two pixels is 0.5, so they are not conveniently distinguished. On the other hand, after projecting light by means of the first active light source 14, the RGB values of these two pixels become (5.0-0-0) and (0-0-0), and the |R of these two pixels now becomes 5.0, thus red color can be easily distinguished. It can be also understood that the pixel (5.0-0-0) should be comparatively reddish, so the R value increases significantly after being illuminated by the first active light source 14.

Moreover, if the RGB values at any two pixels are respectively (0.5-0-0), (0-0.5-0), then the |R||G of such two pixels are 0.5, 0.5 (| is 1.0), this means it is not easy to distinguish them. However, after projecting light by means of the first active light source 14 and the second active light source 15 and overlapping the photographic images acquired by projecting light from the first active light source 14 and the second active light source 15, the RGB values at any two pixels now become (5-0-0) and (0-5-0), so the |R||G of such two pixels become 5.0, 5.0 (| is 10), thus allowing to better distinguish the colors and also identifying the image.

Besides, with the reflection feedback values acquired by projecting the light sources of different colors and also based on the intensity of the ambient light, the image processing module 12 can perform the regression analysis so as to adjust the acquired photographic image thereby presenting the acquired image in the original colors. As shown in FIG. 3, upon using the second active light source 15 to project light on a green board, in an environment of 1000 lumens it can detect a green light relative intensity of 100 (while the second active light source 15 is not illuminating yet), so this 100 can be employed as the non-illuminating standard (the intensity of the image in the original colors in an environment having normal light sources by default.)

Following this, when the green board is in an environment of 10 lumens, the relative intensity of green light is detected to be 1 (the second active light source 15 has not illuminated yet), and while the second active light source 15 casts light on the green board, the detected relative intensity is 11 (i.e., the non-illuminated intensity 1 plus the illumination intensity 10 from the second active light source 15.) Therefore, no matter under what kind of conditions the environmental lumen may be, the regression analysis needs to first deduct the detected relative intensity by the illumination intensity of the active light source, thus obtaining the non-illuminated intensity, and then finally multiplying the non-illuminated intensity with the corresponding multiples of the environmental lumen so as to return to a presentation picture in the environment of 1000 lumens.

Hence, when the green board is under the situation of an environment having 1 lumen, through the light projection by the second active light source 15, the image processing module 12 can acquire a reflection feedback value of 10.1 obtained with the green light, so the image processing module 12 can deduct this 10.1 by the light intensity 10 of the active light source and determine the intensity of the green color in the image photographed by the photographic lens 11 is 0.1. Next, by multiplying the intensity with 1000, it is possible to restore the image of the green board acquired in an environment of 1 lumen to the condition in which the environment is of 1000 lumens. In this way, even in an environment of low or insufficient light sources (e.g., an environment of 1 lumen, 0.1 lumen or less), through the reflection feedback values acquired by projecting the light source of different color, and based on the intensity of the ambient light, it is possible to perform adjustments on the acquired photographic image such that the acquired image can present the image of original colors as in an environment having normal light sources.

In addition, because of the environment having low or insufficient light sources (e.g., the environment of 1 lumen, 0.1 lumen or less), the image photographed by the photographic device 1 may tend to become black-and-white; whereas, through the reflection feedback values acquired by projecting the light source of different color, and also based on the intensity of the ambient light, it is possible to adjust the photographic image presenting overly the black-and-white feature to demonstrate the original colors and saturation (including the brightness ratio) as in an environment having normal light sources.

Besides, after adjusting the captured photographic image by means of the regression analysis, it is possible to perform the contrast adjustments on the adjusted image thereby highlighting one or more colors on the captured photographic image.

Moreover, when using the regression analysis to perform adjustments on the acquired image, if the acquired reflection feedback values suddenly drop from a high level to a low level (e.g., the RGB values significantly decrease at the same time), the image processing module 12 can determine it indicates the edge of the object or the profile in a low brightness area, so it is possible to run a line enhancement process thereby emphasizing the edge of the object or the profile in a low brightness area on the acquired photographic image.

Figure 4:
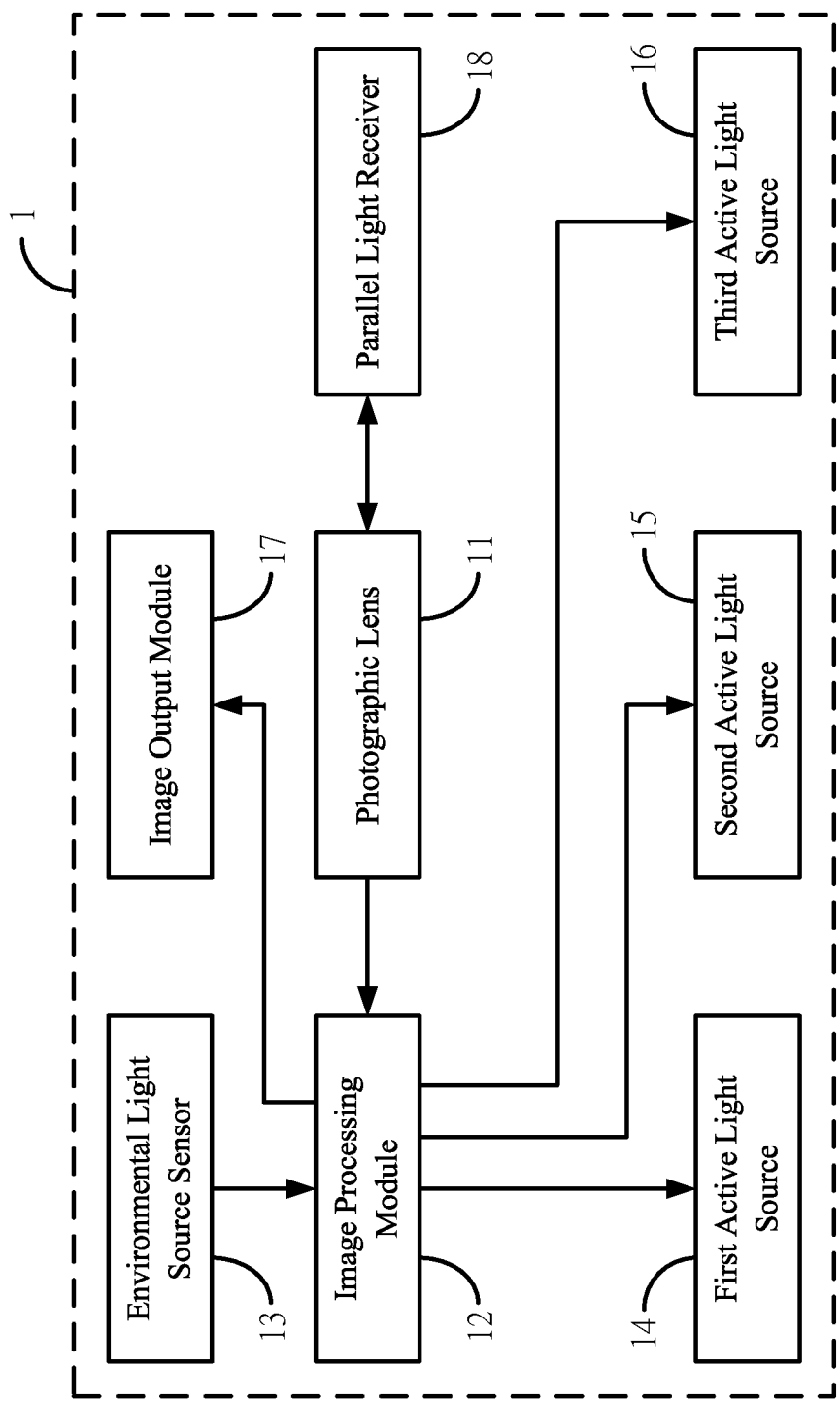
FIG. 4 shows an architectural view for another embodiment of the method for adjusting photographic images according to the present invention.

Also, as shown in FIG. 4, the photographic lens 11 can be further connected to a parallel light receiver 18, in which the parallel light receiver 18 applies the principle of the telescope barrel such that the photographic lens can receive only the parallel light through the parallel light receiver 18 so as to reduce external interferences and improve the resolution of the image captured by the photographic lens 11.

In comparison with other conventional technologies, the method for adjusting photographic images according to the present invention provides the following advantages:

1. The present invention allows to, upon photographing an image, sequentially project light of different color onto a photographic object with an active light source, and with the different reflection feedback values acquired by projecting the light source of different color, further based on the intensity of the ambient light, to perform adjustments on the acquired photographic image such that the acquired image can present an image resolution as in an environment having normal light sources.

2. The present invention also allows to, in the night vision environment, restore the nocturnally photographed image to the image taken in a normal daytime, and further to display color images in the nocturnal photography.

Although the present invention has been disclosed through the detailed descriptions of the aforementioned embodiments, such illustrations are by no means used to restrict the present invention. However, those skilled ones in relevant arts can make appropriate alternations or modifications thereto in practice after understanding the technical characteristics and embodiments of the present invention without departing from the scope and spirit thereof. As a result, the scope of the present invention applied for legal protections should be only delineated by the claims attached in the present specification.

What is claimed is:

1. A method for adjusting photographic images, comprising the following steps:
   upon photographing an image by means of an image sensor, detecting an intensity of an ambient light in an environment, and then sequentially projecting a light source of different color to photographic object with an active light source;
   with a reflection feedback values acquired by the projected light of different colors, and based on the intensity of the ambient light, performing adjustments on an acquired photographic image so as to increase an image resolution of the acquired photographic image;
   wherein, with the acquired reflection feedback values for the projected light source of different colors, and based on the intensity of the ambient light, perform a regression analysis so as to adjust a captured photographic image thereby improving the image resolution or enhancing the chrominance of the captured photographic image;
   wherein, in an environment of low or insufficient light sources, through the acquired reflection feedback values for the projected light sources of different colors, and based on the intensity of the ambient light and the intensity range of light source projected on the photographic object from the active light source, perform adjustments on the acquired photographic image such that the acquired image presents the chrominance as in an environment having normal light sources; and
   wherein, after adjusting the captured photographic image by means of the regression analysis, adjust the contrast of an adjusted image so as to highlight one or more colors on the captured photographic image.

2. The method for adjusting photographic images according to claim 1, further comprising the step of projecting light on the photographic object with three active light sources, and such three active light sources are the green light source, red light source and blue light source.

3. The method for adjusting photographic images according to claim 1, further comprising the step of projecting light on the photographic object with two or more active light sources, and such active light sources are light sources of any colors.

4. The method for adjusting photographic images according to claim 1, further comprising the step of projecting light on the photographic object with two or more active light sources, and such active light sources are light sources of different colors generated by means of infrared light having different wavelengths.

5. The method for adjusting photographic images according to any of claim 1, wherein the active light sources are light emitting diodes.

6. The method for adjusting photographic images according to any of claim 2, wherein the active light sources are light emitting diodes.

7. The method for adjusting photographic images according to any of claim 3, wherein the active light sources are light emitting diodes.

8. The method for adjusting photographic images according to any of claim 4, wherein the active light sources are light emitting diodes.

9. The method for adjusting photographic images according to claim 1, wherein the image sensor is a CCD, CMOS or high resolution CMOS.

10. The method for adjusting photographic images according to claim 1, wherein, upon adjusting the captured photographic image by means of the regression analysis, if the acquired reflection feedback values drop drastically from a high level to a low level, then a line enhancement process is performed so as to highlight the edges of the object and the profile in the low brightness locations on the acquired photographic image.

11. The method for adjusting photographic images according to claim 1, further comprising the step of adjusting the light source intensity projected on the photographic object from the active light source.

12. The method for adjusting photographic images according to claim 1, wherein, in an environment of the low or insufficient light sources, through the acquired reflection feedback values for the projected light sources of different colors, and based on the intensity of the ambient light and the intensity range of light source projected on the photographic object from the active light source, perform adjustments on the generally photographed but exceedingly dim or bright image thereby presenting a color image as in an environment having normal light sources.

13. The method for adjusting photographic images according to claim 1, wherein the image sensor is further connected to a parallel light receiver which allows the image sensor to receive only the incident parallel light in order to reduce external interferences and improve the resolution of the image photographed by the image sensor.

14. The method for adjusting photographic images according to claim 1, wherein the images photographed by projecting the light source of different color are overlapped, and the overlapped image is presented in the original colors.

15. The method for adjusting photographic images according to claim 1, wherein the image photographed by the image sensor is a dynamic image or a static image.

* * * * *